United States Patent
McLintic

[15] 3,665,179
[45] May 23, 1972

[54] LIGHTING SYSTEM

[72] Inventor: William James McLintic, London, England

[73] Assignee: British Lighting Industries Limited, London, England

[22] Filed: Jan. 24, 1969

[21] Appl. No.: 793,800

[30] Foreign Application Priority Data

May 28, 1968 Great Britain......................25,493/68

[52] U.S. Cl..................................240/41.3, 240/3, 240/44, 240/47
[51] Int. Cl..........................................................F21v 13/04
[58] Field of Search ....................240/41.3, 41.35, 41.37, 44, 240/103, 3, 47

[56] References Cited

UNITED STATES PATENTS

| | | | |
|---|---|---|---|
| 841,799 | 1/1907 | Maris | 240/41.3 |
| 1,747,279 | 2/1930 | Andreino | 240/44 |
| 2,798,943 | 7/1957 | Prideaux | 240/41.35 X |
| 3,267,274 | 8/1966 | Johnson | 240/44 X |
| 3,328,574 | 6/1967 | Linse et al. | 240/11.4 |
| 3,379,868 | 4/1968 | Taillon | 240/11.4 |
| 3,381,125 | 4/1968 | Cooper | 240/11.4 |
| 3,428,800 | 2/1969 | Levin et al. | 240/44 X |

Primary Examiner—Samuel S. Matthews
Assistant Examiner—Richard M. Sheer
Attorney—Laurence Burns and Norman J. O'Malley

[57] ABSTRACT

A lighting system has a generally hyperboloidal mirror having a light-reflecting and heat-transmitting coating to form a virtual image of a light source and a lens to project a beam of light of depleted heat content, the virtual image acting as the source of the light projected by the lens.

10 Claims, 3 Drawing Figures

Patented May 23, 1972

3,665,179

WILLIAM JAMES McLINTIC
INVENTOR

BY Lawrence Burns,
ATTORNEY

LIGHTING SYSTEM

The present invention relates to an improved lighting system suitable, inter alia, for studio and stage lighting. In particular, the invention is concerned with the provision of lighting systems in which projection of the heat generated is substantially reduced.

Various systems have been proposed for illuminating the "sets" of television or film studios. Systems most commonly used at present comprise basically an incandescent source sited behind a lens such as a Fresnel lens. The source can be moved along the optical axis of the lens, in and out of focus, in order to vary the divergence of the beam projected. Usually a spherical mirror of glass or aluminum is sited behind the source, with its center of curvature at the source. The lighting system taken in order therefore comprises a spherical mirror, incandescent source and Fresnel lens. With this arrangement, some of the light produced by the source and directed towards the mirror is thus reflected back through the source towards the lens. The effective brightness of the source and the luminous flux in the beam is thus increased. The mirror can be arranged to move with the source along the axis, and is thus in fixed spatial relationship with it.

The main disadvantage with a system of this type is that there is a high infrared content in the flux from the source and in the secondary flux from the mirror. Both the infrared and visible light is focussed by the lens in the direction of the studio set. With high powered sources such as the currently used 2 Kw, 5 Kw, and 10 Kw incandescent lamps, the amount of heat projected can be almost intolerable for performers on the set.

It has been suggested that some form of heat screen or filter be placed in the beam at a convenient point in order to reduce this energy, either by reflecting or absorbing the infrared radiation and transmitting the visible light. Heat filters can be in the form of a heat reflecting coating disposed on glass or quartz substrates, and may be applied directly to the surface of the Fresnel lens. Alternatively the filter can be in the form of a heat absorbing sheet. While such a scheme will be more or less effective, it has several disadvantages, as follows:

Firstly, the optical components concentrate the heat in the direction of the projected beam, thus increasing the required degree of filtering of the infrared. The problems associated with designing a suitable filter are accordingly increased.

Secondly, heat problems arise in the filters themselves, irrespective of the type of filter used. In time, high temperatures can destroy an otherwise satisfactory filter of the "dichroic" type.

Thirdly, there is generally a reduction in the visible light transmitted — even a plain glass sheet will remove 8 percent of beam flux by reflection.

Fourthly, such filters are necessarily large and expensive, and hence the cost of lighting systems utilizing such filters is high.

Fifthly, an infrared filter suitable for this application must be effective over a fairly wide band of wavelengths. It is known that the energy radiated from an incandescent lamp comprises the visible (400 to 750 nm) and the very near infrared (750 to 3,000 nm). Radiation of longer wavelength (up to 10,000 nm) is re-radiated, for example by the lamp envelope, which absorbs practically all the direct energy from the source above 3,000 nm. The U.V. content is negligible and the re-radiated energy can be neglected, since the optical components are ineffective in modifying its direction of propagation. Further, the band of maximum energy from the incandescent sources in use extends from about 1,100 nm which is readily transmitted by the glass or quartz envelope. To reject most of the energy between the visible and 3,000 nm requires a filter which is expensive to make.

Sixthly, the radiation reflected from the filter, whether on the lens surface or on a separate component mounted in front of the lens, is directed into the lantern, and this may cause undesirable temperature rises above those normally obtained.

According to the present invention there is provided a lighting system comprising a projection lens, a primarily light source and a concave mirror having a reflecting coating, the mirror, the primary light source and the lens being positioned on a common optical axis, the mirror being adapted to form a virtual image of the said source, which image forms a secondary source of light, with the light therefrom being projected by the said lens, the reflecting coating applied to the surface of the mirror being such that only a minor proportion of infrared light is reflected.

Preferably the lighting system uses a concave hyperboloidal mirror to produce the virtual image. The coating applied to the mirror is of a dichroic material which reflects visible light. The infrared light energy produced by the primary light source is substantially unaffected by the coating, and is transmitted through the mirror and its reflecting coating. Light from the secondary source projected by the lens therefore has a depleted heat or infrared content. The lighting system is so arranged that location of the image produced by the mirror can be varied about the focal point of the lens.

The present invention will now be described by way of example with reference to the accompanying drawings in which.

Figure 1:
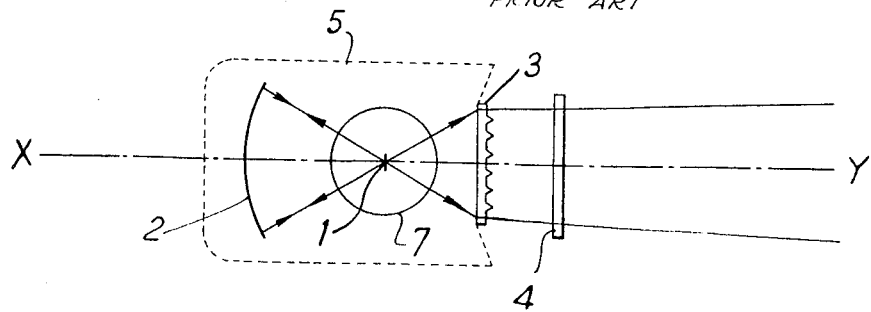
FIG. 1 is a schematic drawing of a known optical system.

An incandescent source having a filament 1 contained within envelope 7 is sited on the optical axis XY of the known system (FIG. 1). A Fresnel lens 3 is positioned in the "spot" form of projection (in which nearly parallel rays are projected) so that the filament 1 is at the focal point of the lens. A mirror 2 of spherical curvature is located behind of the filament with respect to the lens so that its center of curvature coincides with the filament. The mirror and filament are fixed relative to one another and the assembly can be moved along the axis towards the lens so that a beam of greater divergence can be obtained. A filter 4 in the form of an I.R. reflecting coating can be disposed directly on the face of the lens 3. Alternatively a separate component of glass or other vitreous material 4 can be placed in the path of the beam. This component 4 can be of heat absorbing material or can have a heat reflecting coating applied, preferably to the side facing the lens. The whole system is mounted within a housing 5 shown in outline only, one function of which is to prevent stray light reflected from the various components from leaving the housing.

Figure 2:
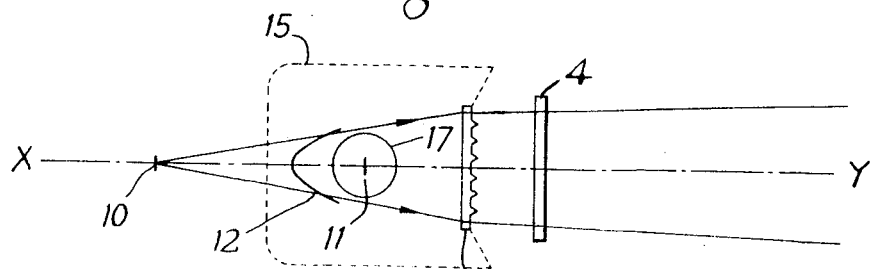
FIG. 2 is a schematic drawing of the lighting system of the present invention.

In the system of this invention the chief modification to components in the optical sense is a change of the function and shape of the mirror 2. As shown in FIG. 2 a mirror 12 is of hyperbolic contour, with focal points approximately at the filament 11 and a point behind the mirror at 10 on the optical axis XY, of the system. The function of the mirror is to produce a virtual source at 10 which is a virtual image of the filament 11 and this virtual source 10 is normally sited at the focal point of a Fresnel lens 13. Thus lens 13 of FIG. 2 has a somewhat longer focal length than its counterpart 3 in FIG. 1. The real source 11 and mirror 12 are coupled as in FIG. 1 in fixed spatial relationship, and both can be moved relative to lens 13 to effect changes in the divergence of the beam projected. Mirror 12 in FIG. 2 is of transparent heat resisting material, preferably glass, and bears a dichroic coating on its optical surface facing the source 11. The dichroic coating is designed to transmit energy in the infrared wave band beginning at approximately 800 nm and upwards. Efficient transmission will only be apparent in the band between 800 nm and 3,000 nm because of the absorbance of the substrate of the mirror if this is of glass. Such coatings are relatively easy to produce compared to the heat reflecting dichroic coatings, and the reflectance of visible energy and the transmission of infrared are of a high order. Values of 96 percent and 60 percent respectively are typical.

By the use of the hyperboloidal mirror 12 in FIG. 2 a virtual source 10 is provided which has much reduced infrared energy, and the beam formed by lens 13 therefore has less infrared energy. The real source 11 in this case is greatly removed from the focal point of lens 13 and since this lens is of low power it is ineffective in concentrating direct energy from source 11 in the direction of the beam. In applications where the greatest possible reduction of heat is required it is still possible to interpose a heat reflecting filter 4, but normally this would not be necessary.

It has been proposed that the spherical mirror 2 in FIG. 1 should be coated with a dichroic heat transmitting filter. It is known however that this spherical mirror, which reflects the radiation directed away from the lens 3, back through the filament towards the lens 3 only contributes an additional 30 percent approximately to the forward beam flux, and therefore even an efficient reduction of the heat energy in the radiation collected by the mirror 2 does not reduce the infrared energy of the forward beam significantly.

Figure 3:
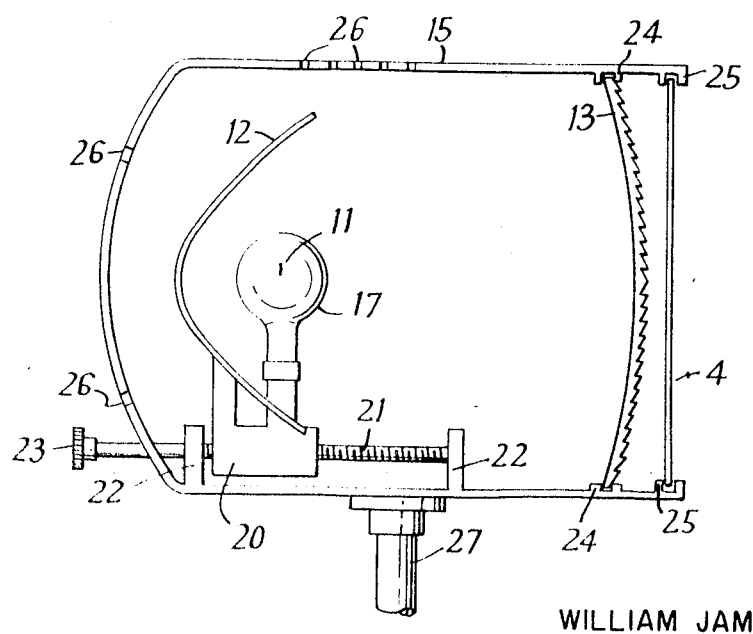
FIG. 3 is a sectional elevation of a lighting system according to the invention.

Referring now to FIG. 3, there is shown a practical form of lighting system according to the invention. The mirror 12 is of generally hyperbolic form, and its surface may be gently stippled or facetted, if "flood" lighting is required. The mirror 12 is carried by a combined mirror and source mounting 20 which is movable towards and away from a Fresnel-type lens 13. The mounting 20 has a threaded bore therethrough which co-operates with a lead screw 21. The lead screw 21 is rotatably journalled between projections provided on the inner surface of the housing 15. A knob 23, accessible from the exterior of the housing 15, is provided to enable the lead screw 21 to be rotated for adjustment of the position of the mounting 20 relative to the lens 13. The housing 15 includes pairs of ribs 24, 25 which project inwardly of the housing, and provide a means for securing the lens 13 and an optional heat reflecting filter 4 to the housing. Apertures 26 are provided in the housing 15 for ventilation so that air can circulate between the interior and exterior of the housing for cooling purposes. A spigot 27 is fitted to the housing 15 so that the lamp assembly can be mounted on a stand or bracket (not shown).

It is feasible that the lighting system of this invention could incorporate conventional light sources used for studio lighting purposes. It will be appreciated, however, that the large envelope 7 of the source used in FIG. 1 is quite impractical for use in the system of FIGS. 2 and 3 unless very large optical components are employed. Maximum efficiency is obtained when compact sources are employed. Tungsten halogen lamps, with their characteristically small envelopes and compact source discharge lamps are especially suitable for use in the proposed system.

I claim:
1. A lighting system comprising:
    a housing,
    a primary light source,
    a concave mirror for producing a secondary light source in the form of a virtual image of the said primary light source substantially spaced from said primary light source, said mirror being coated with a light-reflecting and heat-transmitting material,
    a projection lens having its rear focal point substantially in a plane containing said virtual image for projecting a beam of light energy radiated by said secondary light source,
    said lens being substantially ineffective in projecting light energy radiated from said primary light source,
    said concave mirror, primary light source and projection lens being centered, respectively one behind another on a common optical axis within the said housing, and
    wherein the said light-reflecting and heat-transmitting material reflects only a minor proportion of the infrared energy radiated by said primary light source.

2. A lighting system as claimed in claim 1, wherein said concave mirror has a generally hyperboloidal reflecting surface.

3. A lighting system as claimed in claim 1, wherein said projection lens is of the Fresnel lens.

4. A lighting system as claimed in claim 1, including a mounting carrying both said primary light source and said concave mirror, the said primary light source being located in fixed relationship with and in front of said concave mirror.

5. A lighting system as claimed in claim 4, wherein said mounting is movable towards and away from said projection lens to vary the position of said virtual image about one focal point of said projection lens so as to adjust the divergence of the light beam projected, means for controlling the position of said mounting being provided, which means are operable from the exterior of the housing.

6. A lighting system as claimed in claim 5, wherein said means comprise a lead screw journalled on said housing which engages a correspondingly threaded bore in said mounting.

7. A lighting system as claimed in claim 1, further including a dichroic filter to reflect infrared energy away from the direction in which said beam of light is projected.

8. A lighting system as claimed in claim 7, wherein said dichroic filter is disposed on a light-transparent plate, said plate being located in the beam of light projected by said projection lens.

9. A lighting system as claimed in claim 7, wherein said dichroic filter is disposed on said projection lens.

10. A lighting system according to claim 1, wherein
    said primary light source is a tungsten-halogen lamp,
    said concave mirror is a generally hyperboloidal mirror, on the reflecting surface of which is disposed a light-reflecting and heat-transmitting coating, to produce a secondary light source in the form of a virtual image of said tungsten-halogen primary source,
    said projection lens which projects the beam of light energy radiated by said secondary light source is a Fresnel lens,
    said hyperboloidal mirror, tungsten-halogen primary source and said Fresnel lens being centered, one behind another on a common optical axis within said housing,
    the tungsten-halogen primary source and said hyperboloidal mirror being mounted in fixed spatial relationship on a common support movable along said optical axis towards and away from said Fresnel lens,
    means for controlling the position of said support relative to said Fresnel lens, said means comprising a screw-threaded bar entering said housing and rotatably mounted herein, the screw threads of said bar engaging a correspondingly screw-threaded bore in said support,
    the said light-reflecting and heat-transmitting coating disposed on said hyperboloidal mirror reflecting only a minor proportion of the infrared energy radiated by said tungsten-halogen primary source.

* * * * *